(12) United States Patent
Vaikar et al.

(10) Patent No.: US 8,650,162 B1
(45) Date of Patent: Feb. 11, 2014

(54) METHOD AND APPARATUS FOR INTEGRATING DATA DUPLICATION WITH BLOCK LEVEL INCREMENTAL DATA BACKUP

(75) Inventors: Amol Manohar Vaikar, Pune (IN); Yusuf Batterywala, Pune (IN)

(73) Assignee: Symantec Corporation, Mountain View, CA (US)

( * ) Notice: Subject to any disclaimer, the term of this patent is extended or adjusted under 35 U.S.C. 154(b) by 351 days.

(21) Appl. No.: 12/415,621

(22) Filed: Mar. 31, 2009

(51) Int. Cl.
*G06F 17/30* (2006.01)

(52) U.S. Cl.
USPC ......................................................... 707/692

(58) Field of Classification Search
None
See application file for complete search history.

(56) References Cited

U.S. PATENT DOCUMENTS

| | | | |
|---|---|---|---|
| 6,467,021 B1 * | 10/2002 | Sinclair | 711/113 |
| 7,472,242 B1 * | 12/2008 | Deshmukh et al. | 711/162 |
| 2008/0013830 A1 * | 1/2008 | Patterson et al. | 382/173 |
| 2008/0256143 A1 * | 10/2008 | Reddy et al. | 707/204 |
| 2009/0049260 A1 * | 2/2009 | Upadhyayula | 711/162 |
| 2009/0132616 A1 * | 5/2009 | Winter et al. | 707/204 |
| 2010/0031086 A1 * | 2/2010 | Leppard | 714/15 |
| 2010/0125553 A1 * | 5/2010 | Huang et al. | 707/661 |

OTHER PUBLICATIONS

Waterhouse, Scott, "The Backup Blog: Deduplication Calculator," May 8, 2008. Downloaded from web site http://thebackupblog.typepad.com/thebackupblog/2008/05/deduplication-c.html on Jun. 29, 2009.

Crump, George, "Storage Channel Tips: Backup window reduction methods," Jul. 11, 2008. Downloaded from web site http://searchstoragechannel.techtarget.com/tip/0,289483,sid98_gci1320964,00.html on Jun. 29, 2009.

* cited by examiner

*Primary Examiner* — Ajay Bhatia
*Assistant Examiner* — Grace Park
(74) *Attorney, Agent, or Firm* — Campbell Stephenson LLP

(57) ABSTRACT

A method for integrating data deduplication with block level incremental data backup is described. In one embodiment, the method includes accessing from memory at least one modified data block of a file, wherein the file is partitioned into a plurality of deduplication segments, identifying at least one deduplication segment that corresponds with the at least one modified data block, computing using at least one processor a signature for each deduplication segment of the at least one corresponding deduplication segment and comparing using at least one processor each signature that is associated with the at least one corresponding deduplication segment with signature information that is associated with backup data to identify at least one duplicate data block within the backup data and the at least one modified data block.

19 Claims, 4 Drawing Sheets

METHOD AND APPARATUS FOR INTEGRATING DATA DUPLICATION WITH BLOCK LEVEL INCREMENTAL DATA BACKUP

BACKGROUND

1. Field of the Invention

Embodiments of the present invention generally relate to data protection and deduplication systems and, more particularly, to a method and apparatus for integrating data deduplication with block level incremental data backup.

2. Description of the Related Art

Small to large enterprises utilize block level incremental backup (BLIB) technologies to preserve valuable computer data in order to optimize storage utilization and concurrently reduce downtime during a backup process (i.e., a backup window). The BLIB is configured to maintain information associated with data blocks of files that may be stored in a volume or a backup (e.g., a file by file backup, a raw partition backup, a snapshot and/or the like). Such information may indicate one or more modified data blocks associated with a particular file since a previous backup (e.g., incremental backup, full backup and/or the like) to storage media (e.g., a hard disk array).

For example, the BLIB technologies may be used to identify one or more changed data blocks (i.e., data blocks having new content), one or more added data blocks as well as one or more deleted data blocks associated with the particular file. The BLIB technologies proceed to backup the file by copying the one or more changed data blocks and/or the one or more added data blocks as well as updating a block mapping to record the deletion of the one or more deleted data blocks. Sometimes, the one or more changed data blocks and/or the one or more added data blocks may include identical data (i.e., duplicate data blocks). Unfortunately, the BLIB technologies cannot identify the duplicate data blocks and backs up each and every changed block and/or added block as a result.

Because the BLIB technologies are unable to identify the duplicate data blocks, small to large enterprise also employ deduplication software (e.g., a Single Instance Storage (SIS) solution) to remove duplicate data from computer data (e.g., a volume, a file, a virtual machine image, backup data and/or the like). For example, the computer data may be a backup chain (e.g., a full backup and one or more incremental backups of a source volume that comprises a plurality of files). Storing duplicate data blocks within the backup chain wastes valuable computer resources (e.g., computer memory, processors and/or the like) and/or requires unnecessary storage operations.

The deduplication software reads a particular file in logical order, converts each and every logical data block of the file into one or more deduplication segments (e.g., SIS segments) and calculates a unique signature for each deduplication segment. The conversion is performed because of a size disparity between data blocks (e.g., logical and/or physical data blocks) and deduplication segments. These signatures are compared with pre-populated signatures for the computer data (e.g., files, volumes and/or the like). If a signature associated with a certain deduplication segment matches a pre-populated signature, then there is duplicate data within the computer data. Comparing each and every deduplication segment, however, consumes the valuable computer resources. Especially during incremental backups, many of the deduplication segments are already present in the computer data and very likely to be match signatures for the computer data. Therefore, there is no need to compare each and every deduplication segment if only a few are likely to be backed up.

In other words, the deduplication software is unable to identify which data blocks of the particular file are modified. Current attempts to integrate BLIB technologies with the deduplication software are replete with problems. For example, there is a size disparity between a deduplication segment and a data block as used in BLIB. Each size is configured by respective administrators and thus, most likely different. Some integration attempts do not operate at a deduplication segment (i.e., SIS segment) granularity but at a physical block level granularity. Signatures are computed for changed/added physical data blocks during each incremental backup (e.g., in a changed data block stream). Unfortunately, these signatures will most likely never match signatures that are computed at the deduplication segment granularity due to the size disparity between physical data blocks and the deduplication segments.

Moreover, adding, deleting and/or changing physical data blocks causes an alignment adjustment between each and every logical data block of the file and the deduplication segments due to the size disparity. Adding a data block to an end of the file results in a different deduplication segment to logical data block correspondence. For example, a deduplication segment may be two-fifths of a data block size. When the data block is added to the end of the file, at least three deduplication segments are re-aligned to accommodate the added data block. As such, one or more deduplication segments may now be aligned with a logical data block that is adjacent (e.g., previous) to the added data block. In addition, deleting a data block from middle of the file causes a ripple effect to the alignment between adjoining logical data blocks and each and every corresponding deduplication segment. The current attempts to integrate data depulication and block level incremental backup do not address such alignment adjustments caused by the size disparity between the deduplication segment and the data block.

Duplicate data blocks are repeatedly backed up due to alignment adjustments caused by adding, changing and/or deleting data blocks. The deduplication software may determine that a particular file is modified but is not able to determine which data blocks are modified. As a result, the deduplication software processes an entire file even if only one or more data blocks of the file have been modified. Computing and comparing signatures for unmodified blocks increases deduplication time and computer resource utilization. Furthermore, employing a physical block level granularity for signature computation results in very few matches and wastes valuable computer resources.

Therefore, there is a need in the art for a method and apparatus for efficiently integrating data deduplication with block level incremental backup.

SUMMARY OF THE INVENTION

Embodiments of the present invention generally comprise a method and apparatus for integrating data deduplication with block level incremental data backup. In one embodiment, a method for integrating data deduplication with block level incremental data backup includes accessing from memory at least one modified data block of a file, wherein the file is partitioned into a plurality of deduplication segments, identifying at least one deduplication segment that corresponds with the at least one modified data block, computing using at least one processor a signature for each deduplication segment of the at least one corresponding deduplication segment and comparing using at least one processor each signature that is associated with the at least one corresponding deduplication segment with signature information that is associated with backup data to identify at least one duplicate data block within the backup data and the at least one modified data block.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
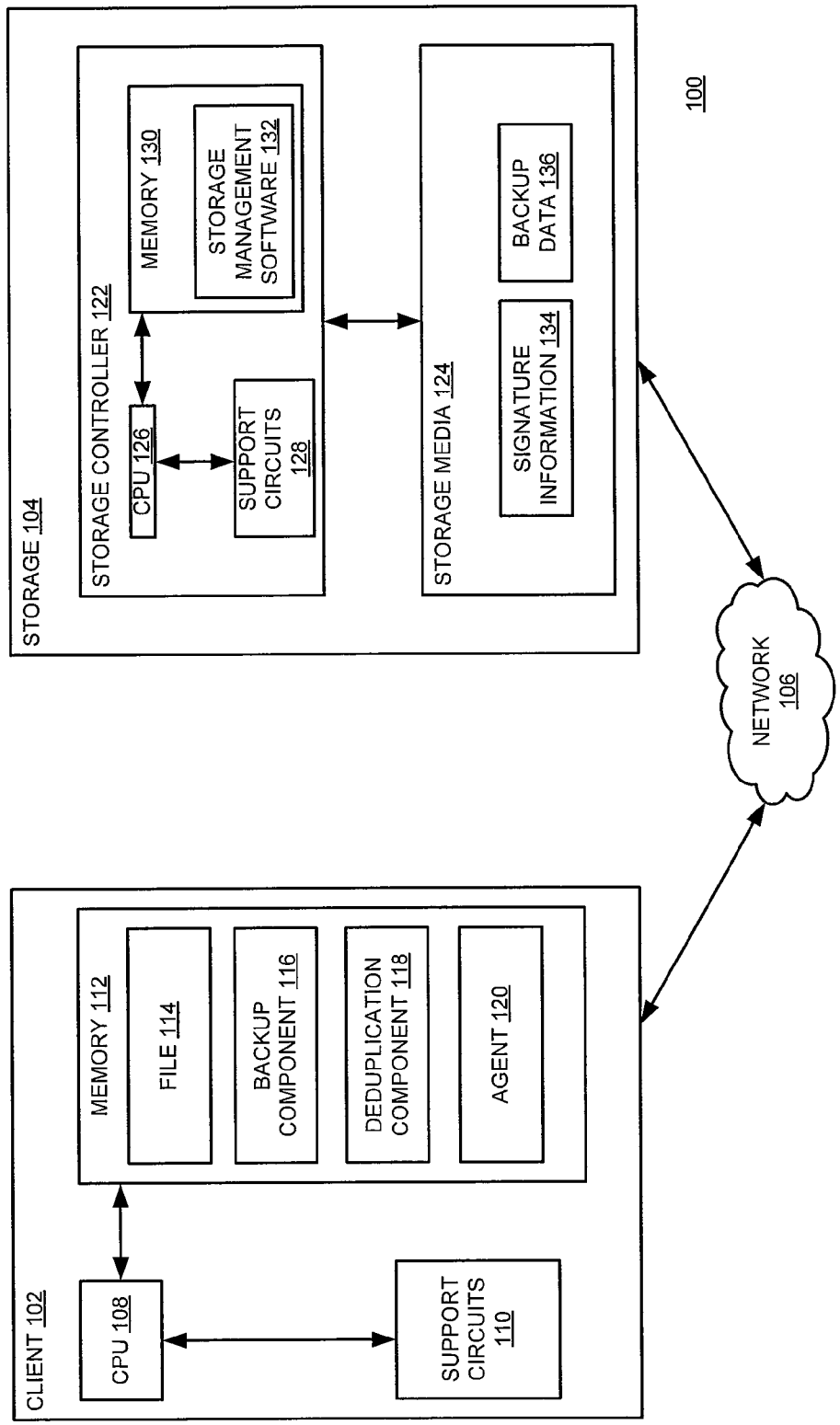
FIG. 1 is a block diagram of a system for integrating data deduplication with block level incremental data backup in accordance with one or more embodiments of the present invention.

FIG. 1 is a block diagram of a system 100 for integrating data deduplication with block level incremental data backup according to one or more embodiments. The system 100 includes a client 102 and storage 104 where each is coupled to one another through a network 106.

The client 102 is a type of computing device (e.g., a laptop, a desktop, a Personal Digital Assistant (PDA), a mobile phone and/or the like) known to one of ordinary skill in the art having the benefit of this disclosure. The client 102 includes a Central Processing Unit (CPU) 108, various support circuits 110 and a memory 112. The CPU 108 may comprise one or more commercially available microprocessors or microcontrollers that facilitate data processing and storage. The various support circuits 110 facilitate an operation of the CPU 108 and may include one or more clock circuits, power supplies, cache, input/output circuits and the like. The memory 112 comprises at least one of Read Only Memory (ROM), Random Access Memory (RAM), disk drive storage, optical storage, removable storage and the like. The memory 112 includes various software packages, such as a backup component 116, a deduplication component 118 and an agent 120. The memory 112 further includes various data, such as a file 114. As discussed in detail below, the agent 120 performs the incremental backup, while the backup component 116 identifies one or more modified data blocks of the file 114. The agent 120 calls the deduplication component 118 to determine whether any data block of the one or more modified data blocks is a duplicate of a data block within the backup data 136.

The storage 104 generally includes various components (i.e., hardware and software) that are configured to manage storage resources. The storage 104 generally includes a storage controller 122 and storage media 124. The storage media 124 may include one or more data storage devices (e.g., hard disk drives, optical drives, magnetic tape drives and/or the like). The storage controller 122 may include a CPU 126, various support circuits 128 and memory 130. The memory 130 further includes storage management software 132 that provides an interface (e.g., Integrated Drive Electronics/AT Attachment (IDE/ATA), Small Computer Systems Interface (SCSI) and/or the like) to the one or more data storage devices for one or more computing devices, such as the client 102. The storage 104 facilitates a backup of critical computer data (e.g., the file 114) as backup data 136 to a backup media (e.g., a sequential backup media (i.e., magnetic tape), an optical storage media (e.g., hard disk) and/or the like). The storage media 124 further includes various data, such as signature information 134 as explained further below.

The network 106 comprises a communication system that connects computers by wire, cable, fiber optic and/or wireless link facilitated by various types of well-known network elements, such as hubs, switches, routers and the like. The network 106 may employ various well-known protocols to communicate information amongst the network resources. For example, the network 106 may be a part of the Internet or intranet using various communications infrastructure, such as Ethernet, Wi-Fi, WiMAX, General Packet Radio Service (GPRS) and/or the like. Furthermore, the network 106 may form a portion of a Storage Network Area (SAN) using various communications infrastructure such as Ethernet, Fibre Channel, InfiniBand, iSCSI and the like.

According to various embodiments, the backup component 116 includes software code that is executed by the CPU 108 to identify one or more modified and/or added logical data blocks that result from updates to the file 114 (e.g., new data written to the file 114). The backup component 116 may utilize a block level incremental backup technology (BLIB) that monitors volumes and identifies one or more modified physical data blocks of the file 114 after a previous incremental backup. Subsequently, the backup component 116 maps the one or more modified physical data blocks to the one or more modified logical data blocks using a mapping service (e.g., VERITAS mapping service). The backup component 116 communicates the one or more modified logical data blocks to the deduplication component 118.

Generally, the deduplication component 118 includes software code that is configured to deduplicate file data within volumes and/or images (e.g., backup image files) using signature comparison techniques. The deduplication component 118 is executed by the CPU 108. The deduplication component 118 may be a callable routine from the backup component 116 and/or the agent 120. The deduplication component 118 identifies one or more duplicate deduplication segments within the backup data 136 and the file 114 according to one or more embodiments. In one embodiment, the deduplication component 118 processes a backup stream (e.g., a sequence of data blocks) that includes the one or more modified logical data blocks of the file 114 and communicated by the agent 120. The deduplication component 118 converts the one or more modified logical data blocks into one or more corresponding deduplication segments as described further below. Then, the deduplication component 118 computes a signature for each of the one or more corresponding deduplication segments. The deduplication component 118 compares each signature with the signature information 134 to identify one or more duplicate deduplication segments within the backup data 136 and the file 114.

The agent 120 include software code that is configured to produce the backup data 136 using one or more backup techniques (e.g., a full backup, an incremental backup, a differential backup and/or the like) without backing up duplicate data blocks as explained in further detail below. According to one or more embodiments, the agent 120 is executed by the CPU 108 in order to coordinate the backup component 116 and the deduplication component 118 to achieve integration of data deduplication and block level incremental backup in which only backup non-duplicate, modified data blocks are backed up. Since the agent 120 backs up only the non-duplicate data blocks of the file 114, a number of storage operations to complete the incremental backup may be minimized.

The file 114 includes user data for one or more software applications within the client 102. Furthermore, the file 114 may be organized in accordance with a particular file format, such as .wav (waveform audio format), .exe (an executable file) and/or the like. In one embodiment, the file 114 may be available as an application file, an installation file, a configuration file, a library file, a program file, a directory file and/or the like. In another embodiment, the file 114 may be available as a text file, a multimedia file, a video file, an audio file, an image file and/or the like. Further, the text file may include a file that holds texts or graphics, such as Office files, HTML (Hyper Text Markup Language) files, PDF (Portable Document Format) files and/or the like.

Generally, the signature information 134 is a database that includes a signature for each deduplication segment within the backup data 136. As mentioned above, the deduplication component 118 computes the signatures for the each deduplication segment within the backup data 136. For example, the signature may be a checksum or a hash of data stored with a particular deduplication segment (e.g., a SIS segment). As explained further below, the signature information 134 is updated after each backup (e.g., incremental backup). If a signature of a particular deduplication segment does not match any signature in the signature information 134, the particular deduplication segment is unique (i.e., non-duplicate) and stored in the signature information 134. Furthermore, any corresponding logical data block is most likely to be a non-duplicate data block and should be backed up to the backup data 136.

The backup data 136 may include one or more files of various types (e.g., emails, word documents, aggregate data types, spreadsheets and/or the like). For example, the backup data 136 may include a volume level or file level backup, such as a VMWARE Virtual Machine Disk backup, a Microsoft Virtual Hard Drive backup, a snapshot, a hard disk/partition backup and/or the like. Furthermore, the backup data 136 may be a backup image (e.g., full backup image, an incremental backup image, a synthetic backup image and/or the like) generated by enterprise backup software (e.g., SYMANTEC NetBackup 6.5) to represent a storage state of a computing environment according to one or more embodiments. For example, each and every data file within an enterprise may be backed via a full backup process. Subsequent updates to each and every data file may be backed up via an incremental backup. In general, the incremental backup of a particular data file includes one or more modified and/or added and indicates any deleted data blocks since a previous backup (e.g., a previous incremental backup or a base full backup). Furthermore, the incremental backup may include cumulative backup, differential backup and/or the like.

According to one or more embodiments, the agent 120 cooperates with the backup component 116 and the deduplication component 118 in order to backup one or more non-duplicate, modified data blocks during an incremental backup. When the agent 120 performs an incremental backup of the file 114, the agent 120 utilizes the backup component 116 to identify one or more modified logical data blocks. Then, the agent 120 utilizes the deduplication component 118 to convert the one or more modified logical data blocks into one or more corresponding deduplication segments for which the deduplication component 118 computes one or more signatures as explained below. Subsequently, the deduplication component 118 compares the one or more signatures with the signature information 134. As such, a matching signature indicates a duplicate deduplication segment within the backup data 136 and the file 114. Any data block that corresponds with the duplicate deduplication segment of the one or more modified logical data blocks is most likely a duplicate data block and is not backed up in order to conserve storage media space.

In one embodiment, the deduplication component 118 converts one or more logical data blocks into one or more corresponding deduplication segments. The deduplication component 118 partitions the file 114 based on a deduplication segment size into a plurality of deduplication segments (e.g., Single Instance Storage (SIS) segments). The deduplication segment size (e.g., a SIS segment size) may be fixed (e.g., an integer multiple of a data block size (i.e., physical data block size), an exact size of or less than the physical data block size and/or the like) or variable (e.g., adjusted to accommodated added data blocks and/or deleted data blocks) as explained below. For example, the data block size (e.g., four (4) Kb) may be twice the deduplication segment size (e.g., two (2) Kb). Each logical data block corresponds with two deduplication segments of the plurality of deduplication segments. Hence, a fifth logical block corresponds with a ninth deduplication segment and a tenth deduplication segment. The deduplication component converts the fifth logical block into the ninth deduplication segment and the tenth deduplication segment.

Figure 3:
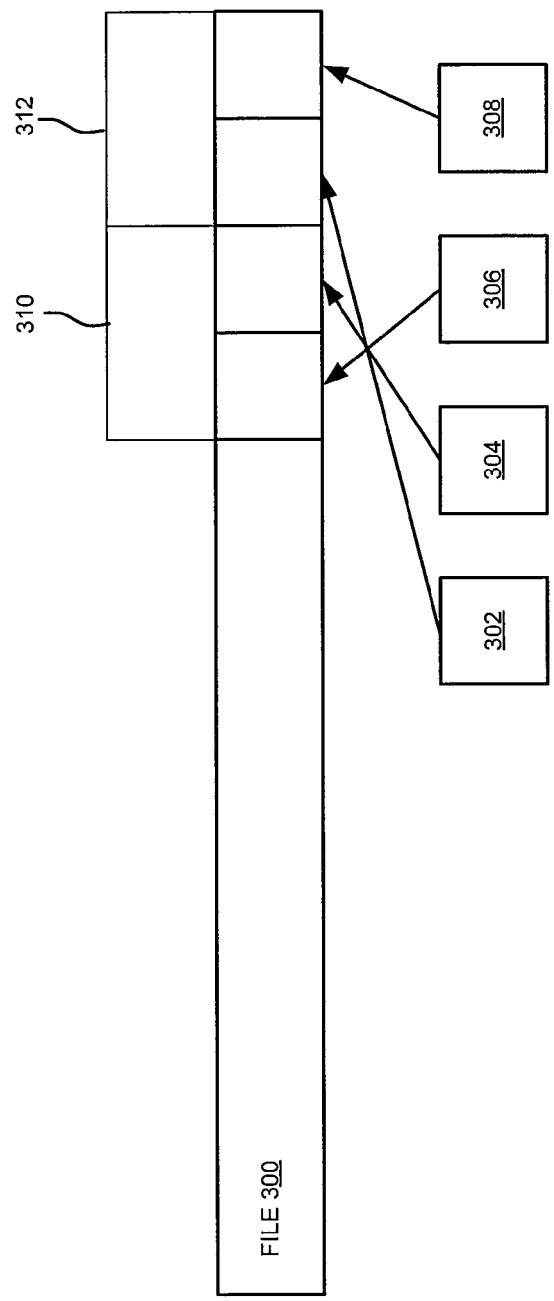
FIG. 3 is a block diagram that illustrates an alignment between logical data blocks of a file and corresponding deduplication segments where a deduplication segment size is larger than a physical data block size according to one or more embodiments of the invention.

The data block size (e.g., two (2) Kb) may be one-half the deduplication segment size (e.g., four (4) Kb). As illustrated in FIG. 3, a particular deduplication segment may overlap two logical data blocks. Each deduplication segment of the plurality of deduplication segments corresponds with two logical data blocks. Hence, a fifth logical block corresponds with a first half of a third deduplication segment. The deduplication component converts the fifth logical block into the third deduplication segment.

On the other hand, the deduplication segment size may be a variable. For example, the deduplication segment size may decrease as the file grows. At the beginning of the file 114, the deduplication segment size may be four (4) kb. Towards the end of the file 114, the deduplication segment size may be two (2) kb. Because data is added to the end of the file, such a variable deduplication segment size may facilitate quick updates the signature information 114.

In one or more embodiments, the deduplication component 118 identifies a duplicate data block within the file 114 and the backup data 136. After the deduplication component 118 converts one or more modified logical data blocks into one or more corresponding deduplication segments, the deduplication component 118 compares each signature of the one or more deduplication segments with the signature information 134. A matching signature indicates that a particular deduplication segment is identical to data within the backup data 136. Therefore, any modified logical data block that is aligned with the particular deduplication segment is mostly likely to be a duplicate data block because such modified logical data blocks include data that is identical to data within the backup data 136. If each deduplication segment that corresponds with a certain modified logical data block has a matching signature, then the modified logical data block is very likely to be a duplicate data block. On the other hand, the deduplication component 118 determines that a particular data block is most likely a non-duplicate data block if each signature associated with one or more corresponding deduplication segments is unique and not included within the signature information 134.

In one or more embodiments, one or more physical data blocks may be added and/or deleted. Due to such an addition and/or deletion, a ripple effect occurs that causes an alignment adjustment between logical data blocks and the deduplication segments of the file 114. One or more logical data locks adjacent to (e.g., after and/or before) the added and/or deleted physical data blocks are affected. If a deduplication segment size (3 kb) is three-fourths of a data block size (4 kb), adding a data block to middle of the file 114 adjusts the alignment by one and one-third deduplication segments. Similarly, deleting the data block adjusts the alignment by one and one-third deduplication segments.

In another embodiment, the deduplication component 118 computes a signature (i.e., a unique SIS-level signature) for each corresponding deduplication segment. Then, the deduplication component 118 compares each computed signature with the signature information 134 to identify one or more duplicate data blocks and/or one or more non-duplicate data blocks. In various embodiments, the deduplication component 118 may utilize various functions, such as a Secure Hash Algorithm (SHA), Message-Digest Algorithm 5 (MD5), a Rabin hash, a Cyclic Redundancy Check (CRC) and/or the like to generate the signatures. For instance, a signature may be a hash that is generated by a hash function, such as SHA-1, that processes a particular data block and in response computes the hash (e.g., a SIS-level signature) If any two signatures are identical, it may be expected that any associated data blocks are also identical.

In one or more embodiments where a deduplication segment size exceeds a physical data block size, the deduplication component 118 determines a segment number (e.g., a SIS segment number) for each deduplication segment that corresponds with one or more modified logical data blocks. For example, after one or more modified physical blocks are mapped to the one or more modified logical data blocks, the deduplication component 118 computes a segment number with which each modified logical data block is associated. The segment number may be computed using various parameters, such as deduplication segment size, physical data block size, logical data block number and/or the like. Furthermore, the deduplication component 118 determines whether any adjoining logical data block is affected and thus, is to be involved in the signature comparison. Because the SIS signature computation is performed at a file level deduplication segment granularity, the deduplication component 118 proceeds to compare each signature with the signature information 134 to identify one or more duplicate data blocks within the one or more modified logical data blocks and the backup data 136.

Figure 2:
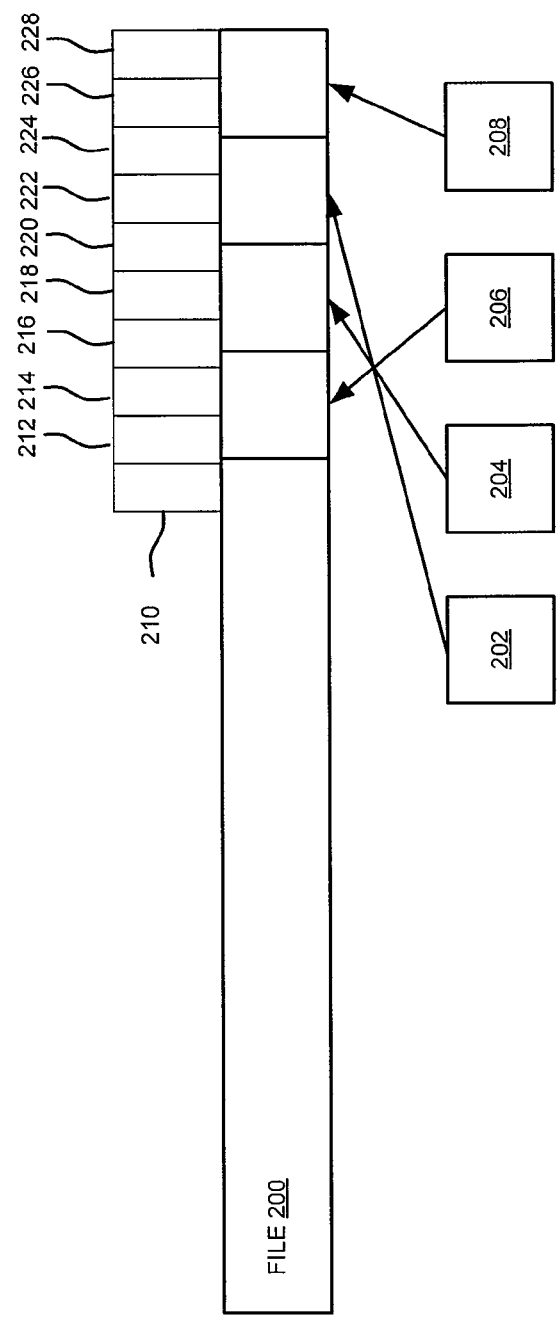
FIG. 2 is a block diagram that illustrates an alignment between logical data blocks of a file and corresponding deduplication segments where a deduplication segment size is smaller than a data block size according to one or more embodiments of the invention.

FIG. 2 is a block diagram that illustrates an alignment between logical data blocks of a file 200 and corresponding deduplication segments where a deduplication segment size is smaller than a data block size according to one or more embodiments of the invention. A data block 202, a data block 204, a data block 206 and a data block 208 are physical data blocks associated with the file 200. As explained below, the data block 202, the data block 204, the data block 206 and the data block 208 may be unmodified or currently modified added and/or deleted since a previous backup according to one or more embodiments of the present invention.

Even though physical data blocks, such as the data block 202, the data block 204, the data block 206 and the data block 208, may be randomly scattered within a computer memory, there is a logical ordering of the physical data blocks as arranged within the file 200. As described above, various mapping techniques may be utilized to determine logical positions in the file 200 for the data block 202, the data block 204, the data block 206 and the data block 208. As mentioned above, a backup component (e.g., the backup component 116) provides information indicating logical positions of one or more changed, deleted or added physical blocks.

As illustrated in FIG. 2, the file 200 includes the data block 206, the data block 204, the data block 202 and the data block 208 in logical order. Each of the physical data blocks of the file 200 corresponds with one or more deduplication segments, such as SIS segments 210. As illustrated in FIG. 2, the SIS segments 210 include a SIS segment 212, a SIS segment 214, a SIS segment 216, a SIS segment 218, a SIS segment 220, a SIS segment 224 and a SIS segment 226, which form an alignment with the physical data blocks as arranged in the logical order. Such an alignment includes an SIS segment that overlaps portions of two adjoining (i.e., adjacent) logical data blocks. As further illustrated for the FIG. 2, the data block 206 corresponds with the SIS segment 212, the SIS segment 214 and the SIS segment 216. The data block 204 corresponds with the SIS segment 216, the SIS segment 218 and the SIS segment 220. The data block 202 corresponds with the SIS segment 220, the SIS segment 222 and the SIS segment 224. The data block 208 corresponds with the SIS segment 224, the SIS segment 226 and the SIS segment 228.

In one embodiment, because the data block 208 is added to an end of the file 200 since a previous incremental backup of the file 200, the alignment between the deduplication segments and the data blocks is adjusted when the file 200 is partitioned for deduplication. As mentioned above, the backup component provides information indicating a logical position of an added physical block. The deduplication component identifies one or more corresponding deduplication segments for the added data block. As illustrated, the SIS segment 226 and the SIS segment 228 correspond with the data block 208 and are added to the SIS segments 210. Furthermore, the data block 208 now corresponds with the SIS segment 224, which previously corresponded with an adjacent data block, such as the data block 202. The SIS segment 224 now overlaps the data block 202 and the data block 208.

During an incremental backup, signatures for the SIS segment 224, the SIS segment 226 and/or the SIS segment 228 are compared with a signature database (e.g., the signature information 134 of FIG. 1) associated with backup data (e.g., the backup data 136 of FIG. 1). If the data block 208 is not a duplicate data block, then the signatures for the SIS segment 224, the SIS segment 226 and/or the SIS segment 228 do not match any signature in the signature database. As such, the data block 208 should be backed up. On the other hand, if the signatures for the SIS segment 224, the SIS segment 226 and/or the SIS segment 228 match one or more signatures in the signature database, then the data block 208 is mostly likely a duplicate data block and should not be backed up. Hence, only SIS segments that are affected by adding the data block are compared with the signature database, which reduces computer resource utilization.

In another embodiment, information provided by the backup component indicates that the data block 202, the data block 204 and the data block 206 are unmodified. Because the data block 202, the data block 204 and the data block 206 are unmodified, the backup data already includes duplicates of the data block 202, the data block 204 and the data block 206. Accordingly, signatures are not computed for the data block 202, the data block 204 and the data block 206 and/or compared with the signature database. Therefore, the data block 202, the data block 204 and the data block 206 are not backed up during the incremental backup of the file 200.

In yet another embodiment, information provided by the backup component indicates that contents of the data block 202 changed after a previous incremental backup. While the alignment between the SIS segments 210 and the logical data blocks of the file 200 is not adjusted, only signatures for SIS segments that correspond with the data block 202 are computed. As illustrated, the SIS segment 220, the SIS segment 222 and the SIS segment 224 correspond with the data block 202. Signatures for such SIS segments are compared to the signature database 128. If there is a match, then there it is very likely that the data block 202 is a duplicate data block despite changes to the contents. If there is no match, then the data block 202 is a non-duplicate data block and should be backed up. Furthermore, the signatures for such segments are stored in the signature database (i.e., update the signature information 134 of FIG. 1).

In a further embodiment, information provided by the backup component indicates that the data block 204 was deleted after a previous incremental backup. The alignment between the SIS segments 210 and the logical data blocks of the file 200 experiences a ripple effect. Accordingly, the SIS segment 216, the SIS segment 218 and the SIS segment 220, which previously corresponded to the data block 204, now correspond with adjoining data blocks, such as the data block 202, the data block 206 and/or the data block 208. For example, the SIS segment 216 now corresponds with the data block 202.

Additionally, a SIS segment size may be modified in order to accommodate space required for an added data block, such as the data block 208, and/or space removed for a deleted data block, such as the data block 204. For example, if the data block 204 is deleted and the deduplication component partitions the file 200 into the SIS segments starting at file beginning, then the SIS segment size may be increased or decreased in order to align each and every remaining data block with the SIS segments evenly. In other words, a SIS segment ends at a same position in logical order as a data block at the end of file 200.

FIG. 3 is a block diagram that illustrates an alignment between logical data blocks of a file 300 and corresponding deduplication segments where a deduplication segment size is larger than a physical data block size according to one or more embodiments of the invention. A data block 302, a data block 304, a data block 306 and a data block 308 are physical data blocks associated with the file 300. As explained below, the data block 302, the data block 304, the data block 306 and the data block 308 may be unmodified or currently modified (e.g., added, deleted or changed) since a previous backup according to one or more embodiments of the present invention.

Similar to FIG. 2, there is a logical ordering of the physical data blocks as arranged within the file 300 (i.e., the logical data blocks). As illustrated in FIG. 3, the file 300 includes the data block 306, the data block 304, the data block 302 and the data block 308 in logical order. Each of the physical data blocks of the file 300 corresponds with one or more deduplication segments, such as SIS segment 310 and a SIS segment 312, which form an alignment with the logical data blocks. Such an alignment may include an SIS segment that encompasses two adjoining (i.e., adjacent) logical data blocks. As further illustrated for the FIG. 2, the SIS segment 310 corresponds with the data block 306 and the data block 304. The SIS segment 312 corresponds with the data block 302 and the data block 308.

In one or more embodiments, the data block 308 is added to an end of the file 300 after the previous backup. The addition of the data block 308 affects the alignment between the SIS segments, such as the SIS segment 310 and the SIS segment 312, and the physical data blocks in logical order, such as the data block 302, the data block 304, the data block 306 and the data block 308. For example, the SIS segment 312 previously included the data block 302 and the data block 304. After the addition of the data block 308, the SIS segment 312 corresponds with the data block 302 and the data block 308 instead. Furthermore, the SIS segment 310 now corresponds with the data block 304 and the data block 306.

Accordingly, a SIS segment number for the SIS segment 312 is determined. Generally, each and every SIS segment is associated with a SIS segment number that reflects a logical position in the file 300. The SIS segment number associated with the SIS segment 312 may be determined using various parameters, such as SIS segment size, the physical data block size, a logical data block number and/or the like. Furthermore, the data block 302, the data block 304 and the data block 306 are affected by the addition of the data block 308 and a SIS segment number is determined for the SIS segment 310. Signatures are computed for the SIS segment 310 and/or the SIS segment 312 and compared to a signature database (e.g., the signature information 134 of FIG. 1). For example, if there is a matching signature for the SIS segment 312, the data block 308 is most likely a duplicate data block and should not be backed up. If there is no match for such a signature, the data block 308 should be backed up.

Figure 4:
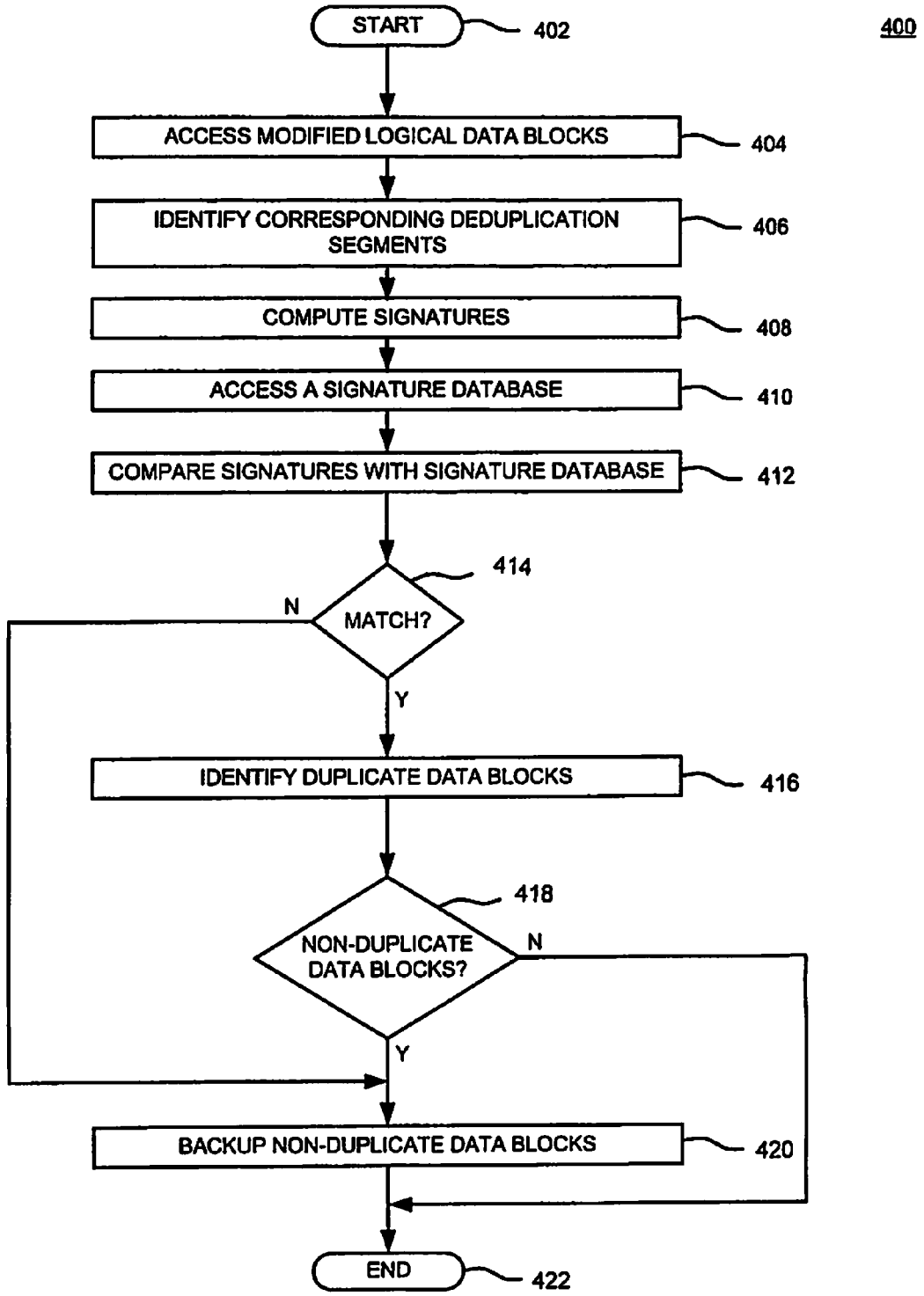
FIG. 4 is a flow diagram of a method for integrating data deduplication with block level incremental data backup in accordance with one or more embodiments of the present invention.

FIG. 4 is a flow diagram of a method 400 for integrating data deduplication with block level incremental data backup according to one or more embodiments of the invention. The method 400 starts at step 402 and proceeds to step 404, at which point modified logical data blocks of a file are accessed. For example, an agent (e.g., the agent 120 of FIG. 1) selects a file and calls a backup component (e.g., a block level incremental backup technology (BLIB)) to identify one or more modified physical data blocks. Then, the agent may utilize a VERITAS Mapping Services (VxMS) to map the one or more modified physical data blocks to one or more logical data blocks of the file according to some embodiments. Depending on a deduplication segment size (e.g., a SIS-Segment size), the agent calls the deduplication component to identify one or more logical data blocks that are to be reconsidered for signature calculation. As described above for FIGS. 1 and 2, these logical data blocks are affected by a size disparity between the dedudplication segment size and a data block size.

The agent instructs the deduplication component to read the physical data blocks that are associated with the one or more affected logical data blocks as well as any adjoining data blocks that are also affected by the size disparity (e.g., an alignment adjustment). At step 406, one or more corresponding deduplication segments are identified. In some embodiments, the agent calls the deduplication component to generate the one or more corresponding dedudplication segments and calculate one or more signatures from the one or more affected logical data blocks as well as any adjoining data block that is also affected as explained below.

The agent calls a deduplication component (e.g., the deduplication component 118 of FIG. 1) to partition the file into a plurality of deduplication segments that align with the file as described above for FIG. 2. One or more deduplication segments correspond with the one or more affected logical data blocks. At step 408, one or more signatures are computed for the one or more corresponding deduplication segments. At step 410, a signature database is accessed. At step 412, the signatures are compared with a signature database. For example, the deduplication component compares each signature with the signature database (e.g., the signature information 144 of FIG. 1) in order to identify one or more duplicate deduplication segments.

At step 414, a determination is made as to whether there is match with any existing signature within the signature database. If at step 414, it is determined that there are no matches with the signature database (option "NO"), then the method 400 proceeds to step 420. If at step 414, it is determined that the there one or more matches (option "YES") with the signature database, then the method 400 proceeds to step 416. At step 416, one or more duplicate data blocks are identified. For example, a matching signature indicates that a particular deduplication segment is identical to a portion of the backup data. As such, the particular deduplication segment corresponds with an affected logical data block that is mostly likely a duplicate data block.

At step 418, a determination is made as to whether there are any non-duplicate data blocks. If at step 418, it is determined that there are no non-duplicate data blocks (option "NO"), then the method 400 proceeds to step 422. If the deduplication segment size is greater than or equal to the data block size, an incremental backup is performed at the block level. Each and every affected logical data block in the file that does not correspond with a duplicate deduplication segment is a non-duplicate data block. Alternatively, if the deduplication segment size is less than the data block size, an incremental backup is performed at deduplication segment-level and not data block-level. Accordingly, there are no non-duplication data blocks. Instead, the deduplication component identifies one or more non-duplicate deduplication segments, which are subsequently backed up to backup data (e.g., the backup data 146 of FIG. 1).

If at step 418, it is determined that there are one or more non-duplicate data blocks (option "YES"), then the method 400 proceeds to step 420. At step 420, the non-duplicate data blocks are backed up. In one embodiment, the agent backs up the non-duplicate data to the backup data (e.g., the backup data 146 of FIG. 1). The method 400 further proceeds to step 422, at which the method 400 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
   identifying at least one modified data block of a file, wherein
      the identifying the at least one modified data block comprises
         detecting that the at least one modified data block was modified after a previous backup operation, and
         the file is stored in a first memory;
   converting the at least one modified data block into at least one deduplication segment, wherein
      a size of the at least one modified data block does not change, and
   a size of the at least one deduplication segment of is configurable independently of the size of the at least one modified data block;
   computing, using at least one processor, a signature for the at least one deduplication segment;
   detecting, using the at least one processor, whether storage media comprising backup data comprises a duplicate deduplication segment, wherein
      the detecting comprises comparing the signature with signature information that is associated with the backup data;
   comparing the size of the at least one modified data block with the size of the at least one deduplication segment;
   selecting a backup size based on a result of the comparison; and
   performing an incremental backup, wherein
      the incremental backup comprises copying at least one data unit to the storage media, and
      a size of the at least one data unit is equal to the backup size.

2. The method of claim 1, wherein
   the duplicate deduplication segment is not present in the backup data.

3. The method of claim 1 further comprising identifying at least one non-duplicate data block amongst the at least one modified data block.

4. The method of claim 3 further comprising: copying the at least one non-duplicate data block to the storage media comprising the backup data in response to the identifying at least one non-duplicate data block.

5. The method of claim 1 further comprising:
   updating the signature information in response to detecting that the signature information does not comprise the signature, wherein
      the updating comprises copying the signature to the signature information.

6. The method of claim 1, wherein the converting uses the size of the at least one deduplication segment.

7. The method of claim 1, wherein the size of the at least one deduplication segment is at least one of fixed or variable.

8. The method of claim 1, further comprising:
   determining an alignment adjustment between the deduplication segment and the at least one modified data block in response to at least one of a data block deletion or a data block addition.

9. The method of claim 1, wherein
   mapping a physical block to a logical block, wherein
      the at least one modified data block comprises the physical block; and
   computing a segment number for the logical block, wherein
      the segment number reflects a logical position of the logical block in the file.

10. An apparatus comprising:
   a memory;
   a central processing unit (CPU) coupled to the memory;
   a backup component for
      identifying at least one modified data block of a file, wherein
         the identifying the at least one modified data block comprises
            detecting that the at least one modified data block was modified after a previous backup operation, and
            the file is stored in a first memory
      comparing a size of the at least one modified data block with a size of at least one deduplication segment;

selecting a backup size based on a result of the comparison; and
performing an incremental backup, wherein
the incremental backup comprises copying at least one data unit to the storage media, and
a size of the at least one data unit is equal to the backup size; and
a deduplication component for
converting the at least one modified data block into the at least one deduplication segment, wherein
the size of the at least one modified data block does not change, and
the size of the at least one deduplication segment of is configurable independently of the size of the at least one modified data block,
computing, using at least one processor, a signature for the at least one deduplication segment, and
detecting, using the at least one processor, whether storage media comprising backup data comprises a duplicate deduplication segment, wherein
the detecting comprises comparing the signature with signature information that is associated with the backup data, and
the duplicate deduplication segment is not identical to data in the backup data.

11. The apparatus of claim 10, wherein the deduplication component identifies at least one non-duplicate data block amongst the at least one modified data block.

12. The apparatus of claim 11 further comprising an agent for copying the at least one non-duplicate data block to the storage media comprising the backup data in response to identifying at least one non-duplicate data block.

13. The apparatus of claim 10, wherein the deduplication component updates the signature information in response to detecting that the signature information does not comprise the signature, wherein
the updating comprises copying the signature to the signature information.

14. The apparatus of claim 10, wherein the converting uses the size of the at least one deduplication segment.

15. The apparatus of claim 10, wherein the size of the at least one deduplication segment is at least one of fixed or variable.

16. The apparatus of claim 10, wherein the deduplication component determines an alignment adjustment between the deduplication segment and the at least one modified data block in response to at least one of a data block deletion or data block addition.

17. A system comprising:
storage media, comprising backup data and signature information for the backup data; and
a client coupled to the storage media comprising an agent for
identifying at least one modified data block of a file, wherein
the identifying the at least one modified data block comprises
detecting that the at least one modified data block was modified after a previous backup operation, and
the file is stored in a first memory,
converting the at least one modified data block into at least one deduplication segment, wherein
a size of the at least one modified data block does not change, and
a size of the at least one deduplication segment of is configurable independently of the size of the at least one modified data block,
computing, using at least one processor, a signature for the at least one deduplication segment,
detecting, using the at least one processor, whether the storage media comprises a duplicate deduplication segment, wherein
the detecting comprises comparing the signature with signature information that is associated with the backup data, and
the duplicate deduplication segment is not identical to data in the backup data,
comparing the size of the at least one modified data block with the size of the at least one deduplication segment;
selecting a backup size based on a result of the comparison, and
performing an incremental backup, wherein
the incremental backup comprises copying at least one data unit to the storage media, and
a size of the at least one data unit is equal to the backup size.

18. The system of claim 17, wherein the agent: identifies at least one non-duplicate data block amongst the at least one modified data block; and copies the at least one non-duplicate data block to the storage media in response to the identifying at least one non-duplicate data block.

19. The system of claim 17, wherein the deduplication component configures the size of the at least one deduplication segment to be at least one of fixed or variable.

* * * * *